Patented Sept. 8, 1925.

1,552,798

UNITED STATES PATENT OFFICE.

JOHN M. DONOHUE, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

No Drawing.     Application filed February 23, 1923. Serial No. 620,609.

*To all whom it may concern:*

Be it known that I, JOHN M. DONOHUE, a citizen of the United States of America, residing at Rochester, in the county of Monroe and State of New York, have invented certain new and useful Improvements in Cellulose-Ether Compositions, of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent film on the machines and by the methods now in use. Other objects will hereinafter appear.

In U. S. Patent No. 1,188,376, Lilienfeld, June 20, 1916, there are disclosed a series of alkyl ethers of cellulose. Certain of these are practically insoluble in water, and my invention relates, but is not limited, to the ethers having that property. While cellulose ethers form thin solutions in the aliphatic halid derivatives of toluene, it has been found that such single solvents by themselves do not dissolve a sufficient proportion of such ethers to make a flowable composition having the desired thickness or viscosity for use in the manufacture of photographic film base by the customary methods or for use in the other plastic arts.

I have discovered that the solvent powers of aliphatic halid derivatives of toluene can be greatly increased by mixing one or more of them with one or more of the lower monohydroxy aliphatic alcohols. By lower monohydroxy aliphatic alcohols I mean those having less than 6 carbon atoms. Typical examples of the aliphatic halid derivatives of toluene are benzyl chloride, benzal chloride, benzo trichlorid, benzyl bromide, benzal bromide and benzo tribromide. It will be noted that the halid atoms are located in the side chain. The mixed solvents are sufficiently powerful to permit the preparation of the desired thick or viscous dopes.

The toluene derivatives and the alcohols may be mixed in widely varying proportions while still retaining the increased solvent power. By way of example, I may mix benzal chloride or benzo trichlorid with an equal weight of methyl alcohol. While the amount of cellulose ether that may be dissolved in such mixed solvents can be varied as desired, it is noted, for the sake of example, that 1 part by weight of water-insoluble ethyl cellulose may be usefully dissolved in from 5 to 7 parts of the described mixed solvents. A properly flowable dope of this strength can not be prepared by using the alcohols or the toluene derivatives alone.

Other substances which impart additional suppleness, or incombustibility, or other qualities, to the film may also be added to the dope, such, for instance, as triphenyl or tricresyl phosphate, monochlornaphthalene, camphor, etc. The ingredients are of the ordinary commercial type and sufficiently purified for the process of film manufacture, so as to give a dope yielding films having the proper relative freedom from color. The viscous-flowable dope above described can be used in connection with the usual film-forming apparatus without the necessity of expensive alterations in the latter.

In the formation of the film considerable amounts of aliphatic halid derivatives of toluene are left therein when the more volatile ingredients of the dope evaporate. This is due to the relatively low volatility of such toluene derivatives. They impart useful plastifying and other properties to such film. Of course, the dopes described above may be thinned out by increasing the proportion of mixed solvent or the volatile ingredients thereof so as to adapt the composition for use in lacquering, as will be understood by those skilled in the art.

Having thus described my invention, what I claim as new and desire to secure by Letters Patent is:

1. A composition of matter comprising cellulose ether and an aliphatic halid derivative of toluene, the ingredients being homogeneously mixed in unprecipitated form.

2. A composition of matter comprising cellulose ether dissolved in a mixture comprising an aliphatic halid derivative of toluene and a lower monohydroxy aliphatic alcohol.

3. A composition of matter comprising cellulose ether and benzyl chloride, the ingredients being homogeneously mixed in unprecipitated form.

4. A flowable composition comprising cellulose ether dissolved in a mixture of benzyl chloride and methyl alcohol.

5. A thick flowable film-forming composition comprising 1 part of cellulose ether dissolved in 5 to 7 parts of a mixture comprising a lower monohydroxy aliphatic alcohol and an aliphatic halid derivative of toluene.

6. A composition of matter comprising water-insoluble ethyl cellulose dissolved in a mixture comprising equal parts by weight of benzyl chloride and methyl alcohol.

7. A composition of matter comprising 1 part of cellulose ether dissolved in from 5 to 7 parts by weight of a mixture comprising a lower monohydroxy aliphatic alcohol and an aliphatic derivative of toluene, said alcohol and said derivative being present in approximately equal parts by weight.

8. A composition of matter comprising approximately 2 parts by weight of water-insoluble ethyl cellulose, 7 parts of benzyl chloride and 7 parts of methyl alcohol.

9. As an article of manufacture, a flowed or deposited film comprising cellulose ether and an aliphatic halid derivative of toluene.

10. As an article of manufacture, a flexible, transparent film comprising water-insoluble ethyl cellulose and benzyl chloride.

Signed at Rochester, New York this 14th day of February 1923.

JOHN M. DONOHUE.